US009815016B2

(12) United States Patent
Udatsu et al.

(10) Patent No.: US 9,815,016 B2
(45) Date of Patent: Nov. 14, 2017

(54) CARBON DIOXIDE CAPTURING SYSTEM AND METHOD OF OPERATING THE SAME

(71) Applicants: Kabushiki Kaisha Toshiba, Minato-ku (JP); Toshiba Plant Systems & Services Corporation, Yokohama-shi (JP)

(72) Inventors: Mitsuru Udatsu, Kawasaki (JP); Satoru Kashimoto, Yokohama (JP); Masatoshi Hodotsuka, Saitama (JP); Hideo Kitamura, Katsushika (JP); Yukio Oohashi, Yokohama (JP); Satoshi Saito, Yamato (JP)

(73) Assignees: KABUSHIKI KAISHA TOSHIBA, Mintao-ku (JP); TOSHIBA PLANT SYSTEMS & SERVICES CORPORATION, Yokohama-shi (JP)

( * ) Notice: Subject to any disclaimer, the term of this patent is extended or adjusted under 35 U.S.C. 154(b) by 256 days.

(21) Appl. No.: 14/744,285

(22) Filed: Jun. 19, 2015

(65) Prior Publication Data

US 2016/0158688 A1 Jun. 9, 2016

(30) Foreign Application Priority Data

Dec. 5, 2014 (JP) ................................ 2014-246716

(51) Int. Cl.
*B01D 53/14* (2006.01)
*B01D 53/18* (2006.01)

(52) U.S. Cl.
CPC ..... *B01D 53/1412* (2013.01); *B01D 53/1425* (2013.01); *B01D 53/1475* (2013.01);
(Continued)

(58) Field of Classification Search
CPC ........... B01D 53/1412; B01D 53/1425; B01D 53/1475; B01D 53/18; B01D 2258/0283;
(Continued)

(56) References Cited

U.S. PATENT DOCUMENTS 4,152,217 A 5/1979 Eisenberg et al.
4,548,620 A 10/1985 Albiol
(Continued)

FOREIGN PATENT DOCUMENTS

CN 102019132 A 4/2011
EP 2 269 712 A1 1/2011
(Continued)

OTHER PUBLICATIONS

Extended European Search Report dated Sep. 28, 2016 in European Patent Application No. 15173631.1.
(Continued)

*Primary Examiner* — Frank Lawrence
(74) *Attorney, Agent, or Firm* — Oblon, McClelland, Maier & Neustadt, L.L.P.

(57) ABSTRACT

In one embodiment, a carbon dioxide capturing system includes an absorber to discharge an absorption liquid having absorbed carbon dioxide, a regenerator to discharge the absorption liquid having released the carbon dioxide, a first line to introduce the absorption liquid discharged from the absorber to the regenerator, a second line to introduce the absorption liquid discharged from the regenerator to the absorber, and a heat exchanger to exchange heat between absorption liquids flowing in the first and second lines. The system further includes a bypass line to branch from the first line between the absorber and the heat exchanger and introduce the absorption liquid to the regenerator without passing through the heat exchanger, a valve on the bypass line, an instrument to measure a value indicating a state of
(Continued)

the regenerator, and a controller to control a degree of opening of the valve based on the measured value.

10 Claims, 8 Drawing Sheets

(52) U.S. Cl.
CPC ...... *B01D 53/18* (2013.01); *B01D 2258/0283* (2013.01); *B01D 2259/65* (2013.01); *Y02C 10/04* (2013.01); *Y02C 10/06* (2013.01)

(58) Field of Classification Search
CPC .......... B01D 2257/504; B01D 2259/65; Y02C 10/04; Y02C 10/06
USPC .......... 96/234, 244, 251, 252, 253; 95/1, 14, 95/16, 19, 23, 149, 178, 179, 183, 228, 95/236; 423/220, 228, 229
See application file for complete search history.

(56) References Cited

U.S. PATENT DOCUMENTS 6,506,349 B1 * 1/2003 Khanmamedov .. B01D 53/1462 423/210
8,506,693 B2 * 8/2013 Nagayasu .......... B01D 53/1418 422/170
8,920,548 B2 * 12/2014 Hokari .................. B01D 53/62 95/149
2010/0319532 A1 12/2010 Iijima et al.
2011/0041685 A1 * 2/2011 Tanaka .............. B01D 53/1412 95/16
2013/0189174 A1 7/2013 Iijima et al.
2014/0086811 A1 3/2014 Saito et al.
2014/0301927 A1 * 10/2014 Udatsu .................. B01D 53/62 423/220
2015/0246298 A1 9/2015 Rochelle et al.
2015/0361364 A1 * 12/2015 Horizoe .................. C10K 1/08 48/128

FOREIGN PATENT DOCUMENTS

JP 2013-151876 A 8/2013
WO WO 2014/077919 A1 5/2014

OTHER PUBLICATIONS

Amine Best Practices Group Amine Basic Practices Guidelines, Retrieved from the Internet: URL:http://refiningonline.com/abpg-kb/ABPG.5.pdf: XP055303821, May 23, 2007, pp. 1-63.
Office Action dated Jun. 2, 2016 in Australian Patent Application No. 2015203518 (with Search Information Statement).
Partial European Search Report dated May 9, 2016 in Patent Application No. 15173631.1.

* cited by examiner

CARBON DIOXIDE CAPTURING SYSTEM AND METHOD OF OPERATING THE SAME

CROSS REFERENCE TO RELATED APPLICATION

This application is based upon and claims the benefit of priority from the prior Japanese Patent Application No. 2014-246716, filed on Dec. 5, 2014, the entire contents of which are incorporated herein by reference.

FIELD

Embodiments described herein relate to a carbon dioxide capturing system and a method of operating the same.

BACKGROUND

In recent years, carbon dioxide capture and storage (CCS) technology has received attention as an effective measure for the global warming problem. For example, a carbon dioxide capturing system is energetically researched and developed that captures carbon dioxide in a process exhaust gas generated from a thermal power plant, steelworks, a garbage incinerator or the like.

In a case where the carbon dioxide capturing system is provided in a facility such as the power plant, the carbon dioxide capturing system is desired, in the occasion of normal stopping or emergency of the facility, to be quickly brought into a safe state such as a stopped state or a state in which the standby operation is possible. However, since the carbon dioxide capturing system in a large-scale facility retains a large amount of absorption liquid and is provided with large-scale instruments, it takes a long time to bring it into the safe state, for example. Accordingly, there is an idea that a high-temperature portion in the carbon dioxide capturing system is quickly cooled to quickly bring the carbon dioxide capturing system into the safe state.

DETAILED DESCRIPTION

Embodiments will now be explained with reference to the accompanying drawings.

In one embodiment, a carbon dioxide capturing system includes an absorber configured to bring a gas containing carbon dioxide into contact with an absorption liquid capable of absorbing the carbon dioxide, and to discharge the absorption liquid having absorbed the carbon dioxide, a regenerator configured to cause the absorption liquid discharged from the absorber to release the carbon dioxide, and to discharge the absorption liquid having released the carbon dioxide, a first absorption liquid line configured to introduce the absorption liquid discharged from the absorber to the regenerator, a second absorption liquid line configured to introduce the absorption liquid discharged from the regenerator to the absorber, and a heat exchanger configured to exchange heat between the absorption liquid flowing in the first absorption liquid line and the absorption liquid flowing in the second absorption liquid line. The system further includes a bypass line configured to branch from the first absorption liquid line between the absorber and the heat exchanger, and to introduce the absorption liquid to the regenerator without passing through the heat exchanger, at least one absorption liquid valve provided on the bypass line, at least one measuring instrument configured to measure a value that indicates a state of the regenerator, and a controller configured to control a degree of opening of the absorption liquid valve, based on the value measured by the measuring instrument.

First Embodiment

Figure 1:
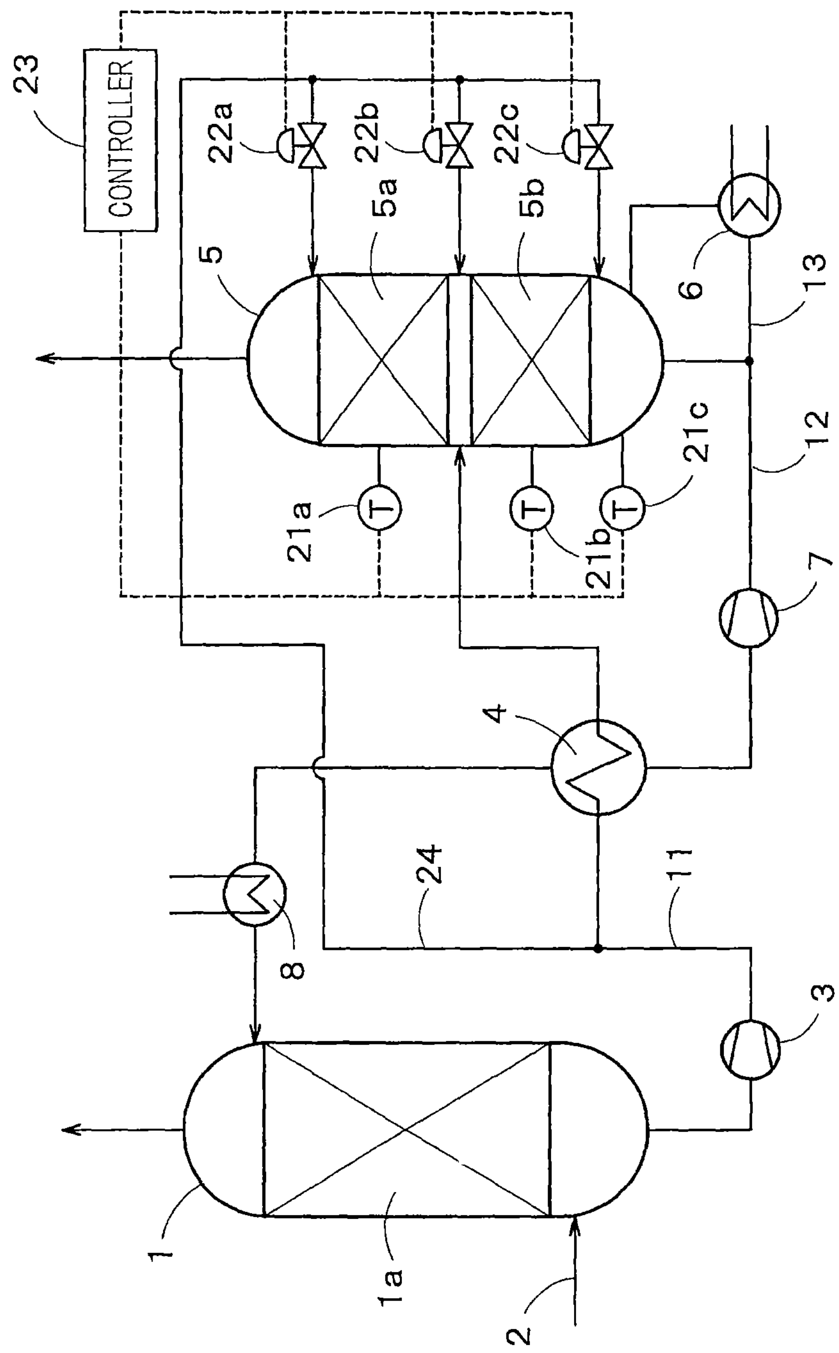
FIG. 1 is a schematic diagram illustrating a configuration of a carbon dioxide capturing system of a first embodiment.

FIG. 1 is a schematic diagram illustrating a configuration of a carbon dioxide capturing system of a first embodiment.

The carbon dioxide capturing system in FIG. 1 includes an absorber 1, a process exhaust gas line 2 as an example of a gas line, a rich liquid pump 3, a regenerative heat exchanger 4 as an example of a heat exchanger, a regenerator 5, a reboiler 6 as an example of a heater, a lean liquid pump 7, a cooler 8, a rich liquid line 11 as an example of a first absorption liquid line, and lean liquid lines 12 and 13 as an example of a second absorption liquid line.

The absorber 1 is constituted, for example, of a counter flow-type gas-liquid contactor. In the absorber 1, a process exhaust gas containing carbon dioxide is introduced from its lower part and an absorption liquid (lean liquid) capable of absorbing carbon dioxide is introduced from its upper part. The process exhaust gas is introduced into the absorber 1 from the process exhaust gas line 2 and the lean liquid is introduced into the absorber 1 from the lean liquid line 12.

The absorber 1 brings the process exhaust gas and the absorption liquid into gas-liquid contact with each other. Then, the absorber 1 discharges the absorption liquid having absorbed the carbon dioxide (rich liquid) from its lower part, and from its upper part, discharges an absorber discharge gas containing the process exhaust gas from which carbon dioxide is removed. The rich liquid is discharged from the absorber 1 to the rich liquid line 11.

The absorber 1 of the present embodiment has a structure in which one or more stages of packing fillers or trays are disposed in order to facilitate efficient gas-liquid contact mentioned above. The absorber 1 in FIG. 1 includes one stage of packing filler is as one example.

The process exhaust gas is introduced into the absorber 1 through the process exhaust gas line 2 from a facility generating the process exhaust gas. Examples of such a facility include a thermal power plant, steelworks, garbage incinerator and the like.

Moreover, while examples of the absorption liquid include an amine-based aqueous solution such as monoethanolamine and diethanolamine, an alkaline aqueous solution, an ionic liquid and its aqueous solution, and the like, they are not limited to these.

The rich liquid pump 3 and the regenerative heat exchanger 4 are provided on the rich liquid line 11. The absorption liquid discharged from the absorber 1 is transferred by the rich liquid pump 3 to the regenerator 5 through the rich liquid line 11, and introduced into the regenerator 5. In this stage, the regenerative heat exchanger 4 exchanges heat between the absorption liquid flowing in the rich liquid line 11 and the absorption liquid flowing in the lean liquid line 12 to heat the absorption liquid flowing in the rich liquid line 11.

The regenerator 5 is constituted, for example, of a counter flow-type gas-liquid contactor. The regenerator 5 heats the absorption liquid by gas-liquid contact with a gas from the reboiler 6, and thereby, causes the absorption liquid to release carbon dioxide and vapor. Then, the regenerator 5 discharges a regenerator discharge gas containing the released carbon dioxide and vapor from its upper part, and from its lower part, discharges the absorption liquid (lean liquid) having released the carbon dioxide. The lean liquid is discharged from the regenerator 5 to the lean liquid line 12.

The reboiler 6 is provided on the lean liquid line 13. The lean liquid line 13 branches from the lean liquid line 12 and returns a part of the absorption liquid discharged from the regenerator 5 into the regenerator 5 through the reboiler 6. In this stage, the reboiler 6 heats the absorption liquid by heat exchange between vapor which is an external heat source and the absorption liquid, and thereby, causes the absorption liquid to release carbon dioxide and vapor. These gases are returned into the regenerator 5 along with the absorption liquid and used for heating the absorption liquid in the regenerator 5.

The regenerator 5 of the present embodiment has a structure in which one or more stages of packing fillers or trays are disposed in order to facilitate efficient gas-liquid contact mentioned above. The regenerator 5 in FIG. 1 includes two stages of packing fillers 5*a* and 5*b* as one example.

The lean liquid pump 7, the regenerative heat exchanger 4 and the cooler 8 are provided on the lean liquid line 12. The absorption liquid discharged from the regenerator 5 is transferred by the lean liquid pump 7 to the absorber 1 through the lean liquid line 12, and introduced into the absorber 1. In this stage, the regenerative heat exchanger 4 exchanges heat between the absorption liquid flowing in the lean liquid line 12 and the absorption liquid flowing in the rich liquid line 11 to cool the absorption liquid flowing in the lean liquid line 12. The absorption liquid flowing in the lean liquid line 12 is further cooled by the cooler 8.

While the regenerator discharge gas discharged from the regenerator 5 undergoes a succeeding processing step different depending on its usage, typically, moisture is condensed to be removed therefrom by cooling. After that, the regenerator discharge gas from which the moisture is removed is converted by a compression pump into a state depending on its usage, such as a super-critical state and a liquid state, and stored or transported by a tank, lorry, pipeline or the like.

The carbon dioxide capturing system in FIG. 1 further includes thermometers 21*a* to 21*c* as an example of at least one measuring instrument, absorption liquid valves 22*a* to 22*c* as an example of at least one absorption liquid valve, a controller 23, and a rich liquid bypass line 24 as an example of a bypass line.

In the following description, one arbitrary thermometer of the thermometers 21*a* to 21*c* is represented by reference numeral 21. Similarly, one arbitrary absorption liquid valve of the absorption liquid valves 22*a* to 22*c* is represented by reference numeral 22.

[Thermometers 21*a* to 21*c*]

The thermometers 21*a* to 21*c* measure temperatures in the regenerator 5. The temperature in the regenerator 5 is an example of a value that indicates a state of the regenerator 5. Examples of the temperatures in the regenerator 5 include a temperature of the absorption liquid in the regenerator 5, and an atmospheric temperature in the regenerator 5. The thermometers 21*a* to 21*c* of the present embodiment measure the temperatures at different points in the regenerator 5. Specifically, the thermometers 21*a*, 21*b* and 21*c* of the present embodiment measure the temperature of the absorption liquid in the packing filler 5*a*, the temperature of the absorption liquid in the packing filler 5*b*, and the temperature of the absorption liquid collected in a bottom part of the regenerator 5, respectively. The thermometers 21*a* to 21*c* output signals containing the measured temperatures to the controller 23.

[Rich Liquid Bypass Line 24]

The rich liquid bypass line (hereafter referred to as "bypass line") 24 branches from the rich liquid line 11 between the absorber 1 and the regenerative heat exchanger 4. The absorption liquid (rich liquid) flowing into the bypass line 24 from the rich liquid line 11 is introduced into the regenerator 5 without passing through the regenerative heat exchanger 4. Therefore, the bypass line 24 can introduce the low-temperature absorption liquid which is not heated by the regenerative heat exchanger 4 into the regenerator 5.

[Absorption Liquid Valves 22*a* to 22*c*]

The absorption liquid valves 22*a* to 22*c* are provided on the bypass line 24. The bypass line 24 of the present embodiment branches to first to third branch lines. The first, second and third branch lines are connected to the regenerator 5 on an upper side of the packing filler 5*a*, between the packing fillers 5*a* and 5*b*, and on a lower side of the packing filler 5*b*, respectively. The absorption liquid valves 22*a* to 22*c* of the present embodiment are provided on the first to third branch lines, respectively. The absorption liquid valves 22*a* to 22*c* of the present embodiment are flow regulating valves which can regulate flow rates of the absorption liquid by controlling their degrees of opening.

[Controller 23]

The controller 23 controls the degrees of opening of the absorption liquid valves 22*a* to 22*c*, based on the temperatures measured by the thermometers 21*a* to 21*c*. For example, when the temperature (temperature value) of the thermometer 21*c* elevates, the controller 23 increases the degree of opening of the absorption liquid valve 22*c*. Thereby, the controller 23 can cool the absorption liquid collected in the bottom part of the regenerator 5 with the absorption liquid from the absorption liquid valve 22*c* to reduce the temperature of the thermometer 21*c*. As described above, according to the present embodiment, the regenerator 5 which is a high-temperature part in the carbon dioxide capturing system can be quickly cooled by introducing the low-temperature absorption liquid.

The controller 23 of the present embodiment controls the degree of opening of the absorption liquid valve 22*a* based on the temperature of the thermometer 21*a*, controls the degree of opening of the absorption liquid valve 22*b* based on the temperature of the thermometer 21*b*, and controls the degree of opening of the absorption liquid valve 22*c* based on the temperature of the thermometer 21*c*. Therefore, when the temperature of a certain thermometer 21 elevates, the controller 23 of the present embodiment increases the degree of opening of the absorption liquid valve 22 near the thermometer 21, and thereby, the absorption liquid near the thermometer 21 can be quickly cooled.

The controller 23 of the present embodiment controls the degree of opening of the absorption liquid valve 22*a* such that the degree of opening of the absorption liquid valve 22*a* is an increasing function of the temperature of the thermometer 21*a*. Namely, the controller 23 of the present embodiment increases the degree of opening of the absorption liquid valve 22*a* as the temperature of the thermometer 21*a* elevates. Thereby, the temperature of the absorption liquid near the thermometer 21*a* can be suppressed from elevating. The same holds true for the absorption liquid valves 22*b* and 22*c*.

Hereafter, a flow rate of the absorption liquid discharged from the absorber 1 to the rich liquid line 11 is represented by a rich liquid flow rate A. Moreover, a flow rate of the absorption liquid introduced from the rich liquid line 11 to the regenerator 5 is represented by a rich liquid flow rate B. Moreover, a flow rate of the absorption liquid introduced from the bypass line 24 to the regenerator 5 is represented by a bypass rich liquid flow rate C. In the present embodiment, these flow rates complete the relation "A=B+C".

The controller 23 regulates the degrees of opening of the absorption liquid valves 22*a* to 22*c*, and thereby, can control the flow rate of the absorption liquid introduced from the bypass line 24 to the regenerator 5, that is, the bypass rich liquid flow rate C. When the absorption liquid is introduced from the bypass line 24 to the regenerator 5, the controller 23 of the present embodiment controls the degrees of opening of the absorption liquid valves 22*a* to 22*c* such that the bypass rich liquid flow rate C is 80% or less of the rich liquid flow rate A ($0<C\leq0.8A$).

When the bypass rich liquid flow rate C is larger than 80% of the rich liquid flow rate A, the rich liquid flow rate B is smaller than 20% of the rich liquid flow rate A. Therefore, the flow rate of the rich liquid introduced to the regenerative heat exchanger 4 is small, and the exchanged heat amount in the regenerative heat exchanger 4 is small. Hence, even after the passage through the regenerative heat exchanger 4, the temperature of the lean liquid flowing in the lean liquid line 12 does not sufficiently descend. As a result, there is possibilities that load on the cooler 8 becomes large and that the lean liquid that is not sufficiently cooled is introduced to the absorber 1, which can cause abnormal heat generation or breakage of the absorber 1 and the cooler 8.

Therefore, the controller 23 of the present embodiment configures the bypass rich liquid flow rate C to be 80% or less of the rich liquid flow rate A. Preferably, the bypass rich liquid flow rate C of the present embodiment is configured to be approximately 50% of the rich liquid flow rate A ($C\approx0.5A$), for example, preferably, configured to be 40 to 60% of the rich liquid flow rate A ($0.4A\leq C\leq0.6A$).

The controller 23 may regulate the degrees of opening of the absorption liquid valves 22*a* to 22*c* to be values different from one another. For example, when the temperature of the thermometer 21*a* is high and the temperature of the thermometer 21*c* is low, the degree of opening of the absorption liquid valve 22*a* may be configured to be large and the degree of opening of the absorption liquid valve 22*c* may be configured to be small. Thereby, the flow rate of the absorption liquid fed to a high-temperature portion in the regenerator 5 from the bypass line 24 can be increased, which can efficiently cool the high-temperature portion.

When a facility (for example, power plant) where the carbon dioxide capturing system is provided is stopped, the controller 23 of the present embodiment brings the carbon dioxide capturing system to the stopped state. Specifically, the controller 23 controls the degrees of opening of the absorption liquid valves 22*a* to 22*c* such that the temperatures of the thermometers 21*a* to 21*c* are the temperatures in the occasion when the carbon dioxide capturing system is stopped. Then, after the temperatures of the thermometers 21*a* to 21*c* become the temperatures at which the carbon dioxide capturing system can be safely stopped, the controller 23 reduces the absorption liquid introduced into the regenerator 5 from the bypass line 24 to be stopped. After that, the absorption liquid circulated in the rich liquid line 11 and the lean liquid line 12 is stopped.

The control by the controller 23 of the present embodiment is effective also in the case where the carbon dioxide capturing system is allowed in standby at low load for low-load operation of the facility when the facility where the carbon dioxide capturing system is provided is in an emergency. In this case, the controller 23 controls the degrees of opening of the absorption liquid valves 22*a* to 22*c* such that the temperatures of the thermometers 21*a* to 21*c* are the temperatures in the occasion when the carbon dioxide capturing system is in standby operation. Then, after the temperatures of the thermometers 21*a* to 21*c* become the temperatures suitable for the standby, the controller 23 reduces the absorption liquid introduced to the regenerator 5 from the bypass line 24 to be stopped, and maintains the circulation of the absorption liquid in the rich liquid line 11 and the lean liquid line 12. Such control may be used, for example, for the case where the inside of the regenerator 5 is wanted to be quickly cooled to stop the release of carbon dioxide from the regenerator 5 without the circulating system of the absorption liquid stopped, or the case where the inside of the regenerator 5 is wanted to be quickly cooled down to an arbitrary temperature.

On the bypass line 24 of the present embodiment, a cooler cooling the absorption liquid flowing in the bypass line 24, and a heat exchanger exchanging heat between the absorption liquid flowing in the bypass line 24 and other fluid may be provided. Examples of such fluid include the absorber discharge gas, the regenerator discharge gas, condensed water obtained from the absorber discharge gas, condensed water obtained from the regenerator discharge gas, and the like.

Moreover, the absorption liquid in the bypass line 24 of the present embodiment may be used not only for cooling the regenerator 5 but also for cooling high-temperature portions (devices, pipes and the like) other than the regenerator 5. Examples of such high-temperature portions include a gas-liquid separator performing gas-liquid separation of the rich liquid flowing between the regenerative heat exchanger 4 and the regenerator 5.

Moreover, the number of the thermometers 21*a* to 21*c* of the present embodiment and the number of the absorption liquid valves 22*a* to 22*c* may be other than three. For example, the carbon dioxide capturing system of the present embodiment may include first to Nth thermometers 21 and first to Nth absorption liquid valves 22 where N is an integer of two or more. In this case, the controller 23 may control the degree of opening of the Kth absorption liquid valve 22, based on the temperature of the Kth thermometer 21 where K is an arbitrary integer satisfying $1\leq K\leq N$.

As described above, the carbon dioxide capturing system of the present embodiment includes at least one absorption liquid valve 22 provided on the bypass line 24, at least one thermometer 21 measuring the temperature in the regenerator 5, and the controller 23 controlling the degree of opening of the absorption liquid valve 22 based on the temperature measured by the thermometer 21. Therefore, according to the present embodiment, a high-temperature portion in the carbon dioxide capturing system can be quickly cooled, and the carbon dioxide capturing system can be quickly brought into a safe state.

Second Embodiment

Figure 2:
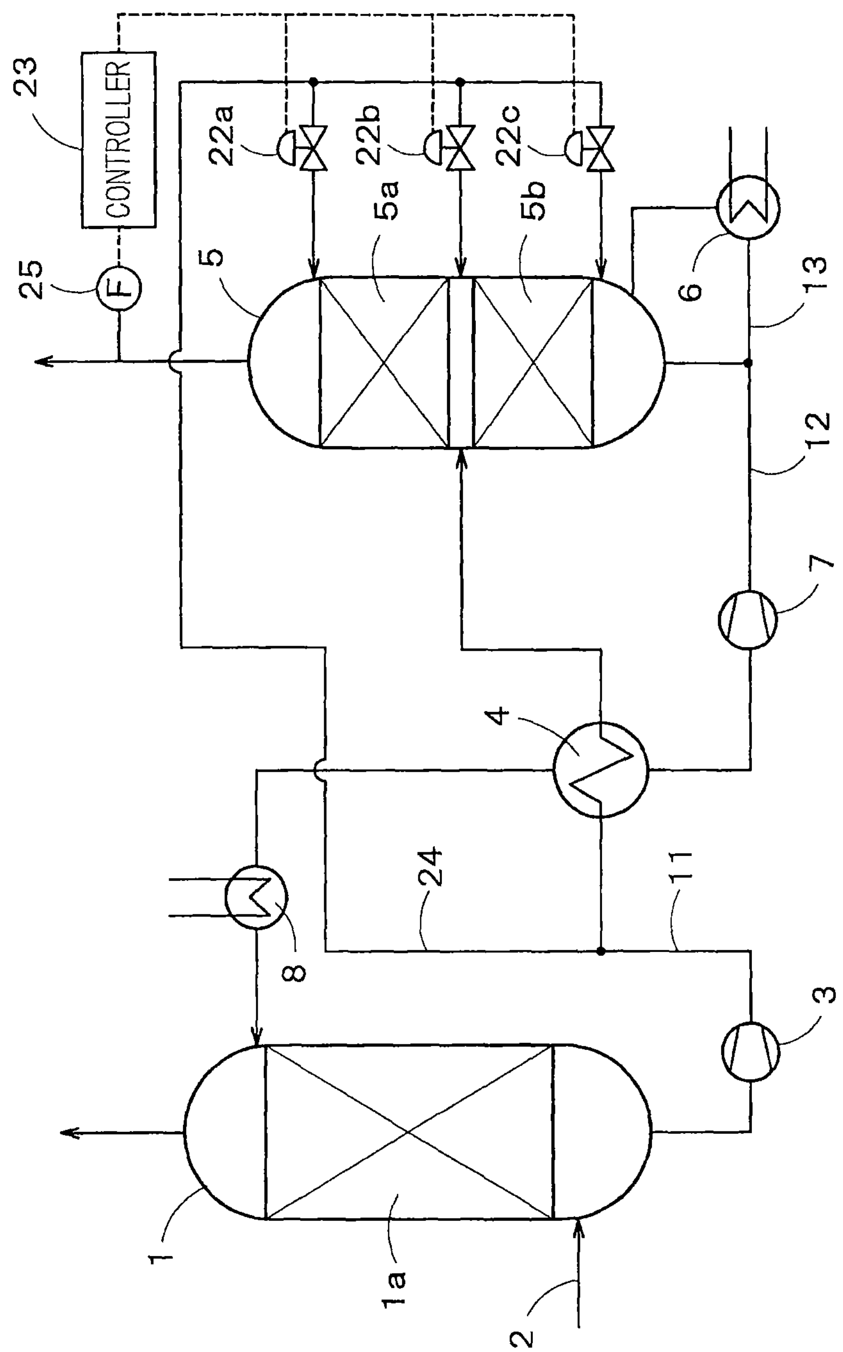
FIG. 2 is a schematic diagram illustrating a configuration of a carbon dioxide capturing system of a second embodiment.

FIG. 2 is a schematic diagram illustrating a configuration of a carbon dioxide capturing system of a second embodiment.

The carbon dioxide capturing system in FIG. 2 has a similar configuration to the carbon dioxide capturing system in FIG. 1. However, in FIG. 2, the thermometers 21*a* to 21*c* are replaced by a flowmeter 25. The flowmeter 25 is an example of the at least one measuring instrument.

The flowmeter 25 measures the flow rate of the regenerator discharge gas discharged from the regenerator 5. The flow rate of the regenerator discharge gas is an example of the value that indicates the state of the regenerator 5. The flowmeter 25 outputs a signal containing the measured flow rate to the controller 23.

The controller 23 controls the degrees of opening of the absorption liquid valves 22*a* to 22*c*, based on the flow rate measured by the flowmeter 25. Typically, when the temperature in the regenerator 5 elevates, the flow rate of the regenerator discharge gas increases. Therefore, when the flow rate (flow rate value) of the flowmeter 25 increases, the controller 23 of the present embodiment increases the degrees of opening of the absorption liquid valves 22*a* to 22*c*. Thereby, the controller 23 can cool the absorption liquid in the regenerator 5 with the absorption liquid from the absorption liquid valves 22*a* to 22*c*, and can reduce the temperature in the regenerator 5. As a result, the flow rate of the flowmeter 25 decreases. As described above, according to the present embodiment, the regenerator 5 which is a high-temperature portion in the carbon dioxide capturing system can be quickly cooled by introducing the low-temperature absorption liquid.

Typically, when the temperature in the regenerator 5 descends, the flow rate of the regenerator discharge gas decreases. When the temperature in the regenerator 5 is sufficiently low, the flow rate of the regenerator discharge gas is smaller than the minimum flow rate at which the detection is possible. Therefore, the controller 23 of the present embodiment controls the degrees of opening of the absorption liquid valves 22*a* to 22*c* such that the degrees of opening of the absorption liquid valves 22*a* to 22*c* are increasing functions of the flow rate of the flowmeter 25. Namely, the controller 23 of the present embodiment reduces the degrees of opening of the absorption liquid valves 22*a* to 22*c* as the flow rate of the flowmeter 25 decreases. Then, when the flow rate of the flowmeter 25 becomes smaller than the minimum flow rate at which the detection is possible, the controller 23 of the present embodiment determines that the regenerator 5 is sufficiently cooled, and brings the degrees of opening of the absorption liquid valves 22*a* to 22*c* at fully-shut states to stop introducing the absorption liquid from the bypass line 24 into the regenerator 5.

The controller 23 of the present embodiment can operate similarly to the controller 23 of the first embodiment. For example, the controller 23 of the present embodiment configures the bypass rich liquid flow rate C to be 80% or less of the rich liquid flow rate A. Moreover, the control by the controller 23 of the present embodiment can be applied to the case where the carbon dioxide capturing system is brought into the stopped state or the state where the standby operation is possible.

The number of the absorption liquid valves 22*a* to 22*c* of the present embodiment may be one, or may be two or more. In the latter case, the controller 23 may regulate the degrees of opening of the absorption liquid valves 22*a* to 22*c* to be different values from one another.

As described above, the carbon dioxide capturing system of the present embodiment includes at least one absorption liquid valve 22 provided on the bypass line 24, at least one flowmeter 25 measuring the flow rate of the gas discharged from the regenerator 5, and the controller 23 controlling the degree of opening of the absorption liquid valve 22 based on the flow rate measured by the flowmeter 25. Therefore, according to the present embodiment, a high-temperature portion in the carbon dioxide capturing system can be quickly cooled, and the carbon dioxide capturing system can be quickly brought into a safe state.

Third Embodiment

Figure 3:
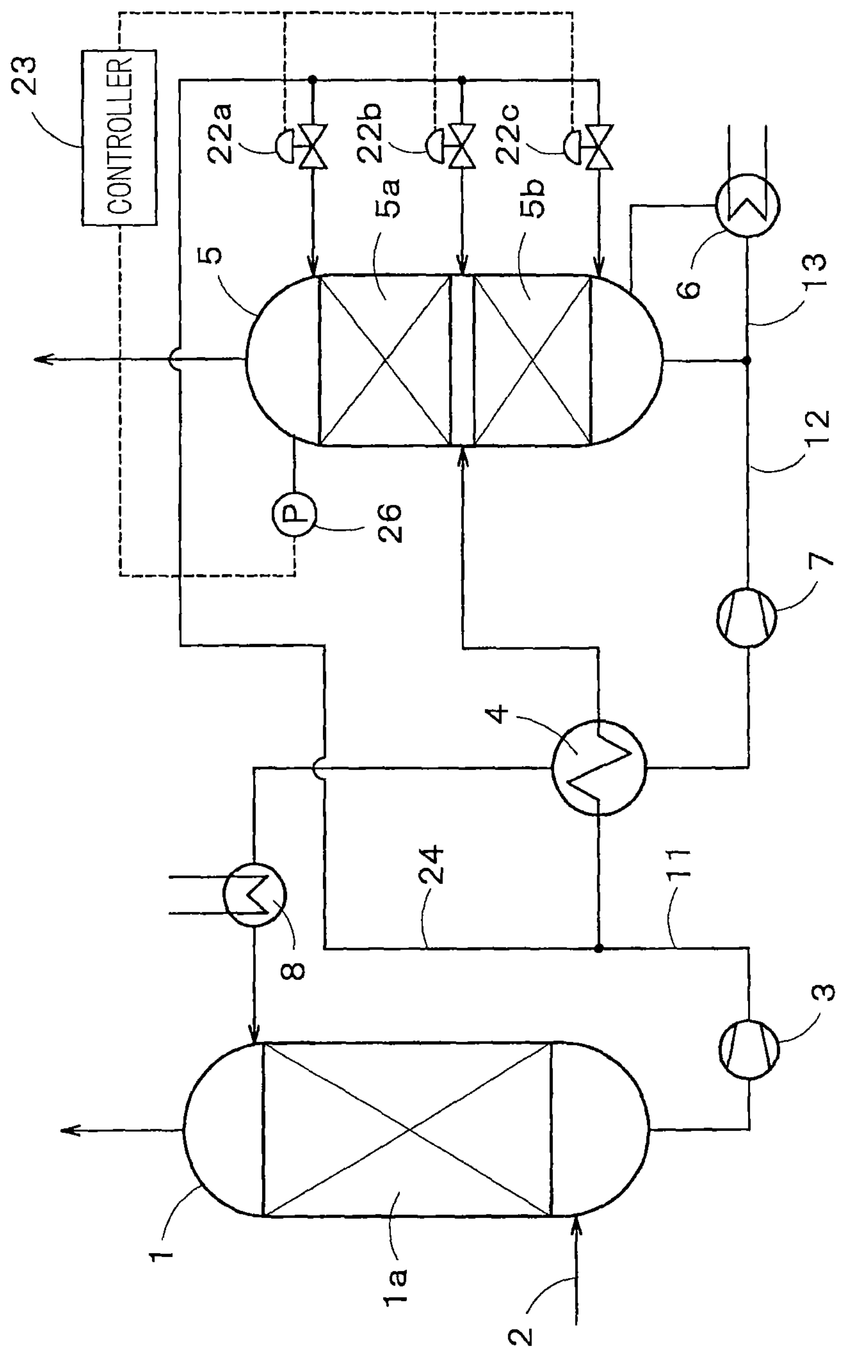
FIG. 3 is a schematic diagram illustrating a configuration of a carbon dioxide capturing system of a third embodiment.

FIG. 3 is a schematic diagram illustrating a configuration of a carbon dioxide capturing system of a third embodiment.

The carbon dioxide capturing system in FIG. 3 has a similar configuration to the carbon dioxide capturing system in FIG. 1. However, in FIG. 3, the thermometers 21*a* to 21*c* are replaced by a manometer 26. The manometer 26 is an example of the at least one measuring instrument.

The manometer 26 measures a pressure in the regenerator 5 (regenerator internal pressure). The regenerator internal pressure is an example of the value that indicates the state of the regenerator 5. The manometer 26 outputs a signal containing the measured pressure to the controller 23.

The controller 23 controls the degrees of opening of the absorption liquid valves 22*a* to 22*c*, based on the pressure measured by the manometer 26. Typically, in the case where a pressure higher than the atmospheric pressure is configured as an operation pressure of the regenerator 5, when the carbon dioxide is being continuously released in the regenerator 5, the regenerator internal pressure is maintained to be the configured pressure by a pressure regulating valve or the like. In the case where the pressure (pressure value) of the manometer 26 is the configured pressure, when the regenerator 5 is required to be cooled, the controller 23 of the present embodiment increases the degrees of opening of the absorption liquid valves 22*a* to 22*c*. Thereby, the controller 23 can cool the absorption liquid in the regenerator 5 with the absorption liquid from the absorption liquid valves 22*a* to 22*c*, and can reduce the temperature in the regenerator 5. As a result, the release reaction of the carbon dioxide stops and the regenerator internal pressure is not maintained to be the configured pressure. Hence, the pressure of the manometer 26 is to decrease. As described above, according to the present embodiment, the regenerator 5 which is a high-temperature portion in the carbon dioxide capturing system can be quickly cooled by introducing the low-temperature absorption liquid.

Typically, when the temperature in the regenerator 5 descends, the regenerator internal pressure decreases. When the temperature in the regenerator 5 becomes sufficiently low, the pressure regulating valve is brought at a fully-open state, and the regenerator internal pressure becomes equal to the atmospheric pressure or the pressure downstream of the regenerator discharge gas line. Therefore, the controller 23 of the present embodiment controls the degrees of opening of the absorption liquid valves 22*a* to 22*c* such that the degrees of opening of the absorption liquid valves 22*a* to 22*c* are increasing functions of the pressure of the manometer 26. Namely, the controller 23 of the present embodiment reduces the degrees of opening of the absorption liquid valves 22*a* to 22*c* as the pressure of the manometer 26 decreases. Then, when the pressure of the manometer 26 becomes smaller than the configured pressure, the controller 23 of the present embodiment determines that the regenerator 5 is sufficiently cooled, brings the degrees of opening of the absorption liquid, valves 22*a* to 22*c* at fully-shut states to stop introducing the absorption liquid from the bypass line 24 into the regenerator 5.

The controller 23 of the present embodiment can operate similarly to the controller 23 of the first embodiment. For example, the controller 23 of the present embodiment configures the bypass rich liquid flow rate C to be 80% or less of the rich liquid flow rate A. Moreover, the control by the controller 23 of the present embodiment can be applied to the case where the carbon dioxide capturing system is brought into the stopped state or the state where the standby operation is possible.

The number of the absorption liquid valves 22*a* to 22*c* of the present embodiment may be one, or may be two or more. In the latter case, the controller 23 may regulate the degrees of opening of the absorption liquid valves 22*a* to 22*c* to be different values from one another.

As described above, the carbon dioxide capturing system of the present embodiment includes at least one absorption liquid valve 22 provided on the bypass line 24, at least one manometer 26 measuring the pressure in the regenerator 5, and the controller 23 controlling the degree of opening of the absorption liquid valve 22 based on the pressure measured by the manometer 26. Therefore, according to the present embodiment, a high-temperature portion in the carbon dioxide capturing system can be quickly cooled, and the carbon dioxide capturing system can be quickly brought into a safe state.

Fourth to Eighth Embodiments

Carbon dioxide capturing systems of fourth to eighth embodiments are modifications of the carbon dioxide capturing systems of the first to third embodiments. Each of the systems of the fourth to eighth embodiments includes the thermometers 21*a* to 21*c*, the absorption liquid valves 22*a* to 22*c*, the controller 23 and the rich liquid bypass line 24, similarly to the system of first embodiment (refer to FIGS. 4 to 8). However, the thermometers 21*a* to 21*c* of the fourth to eighth embodiments may be replaced by the flowmeter 25 of the second embodiment or the manometer 26 of the third embodiment.

Figure 4:
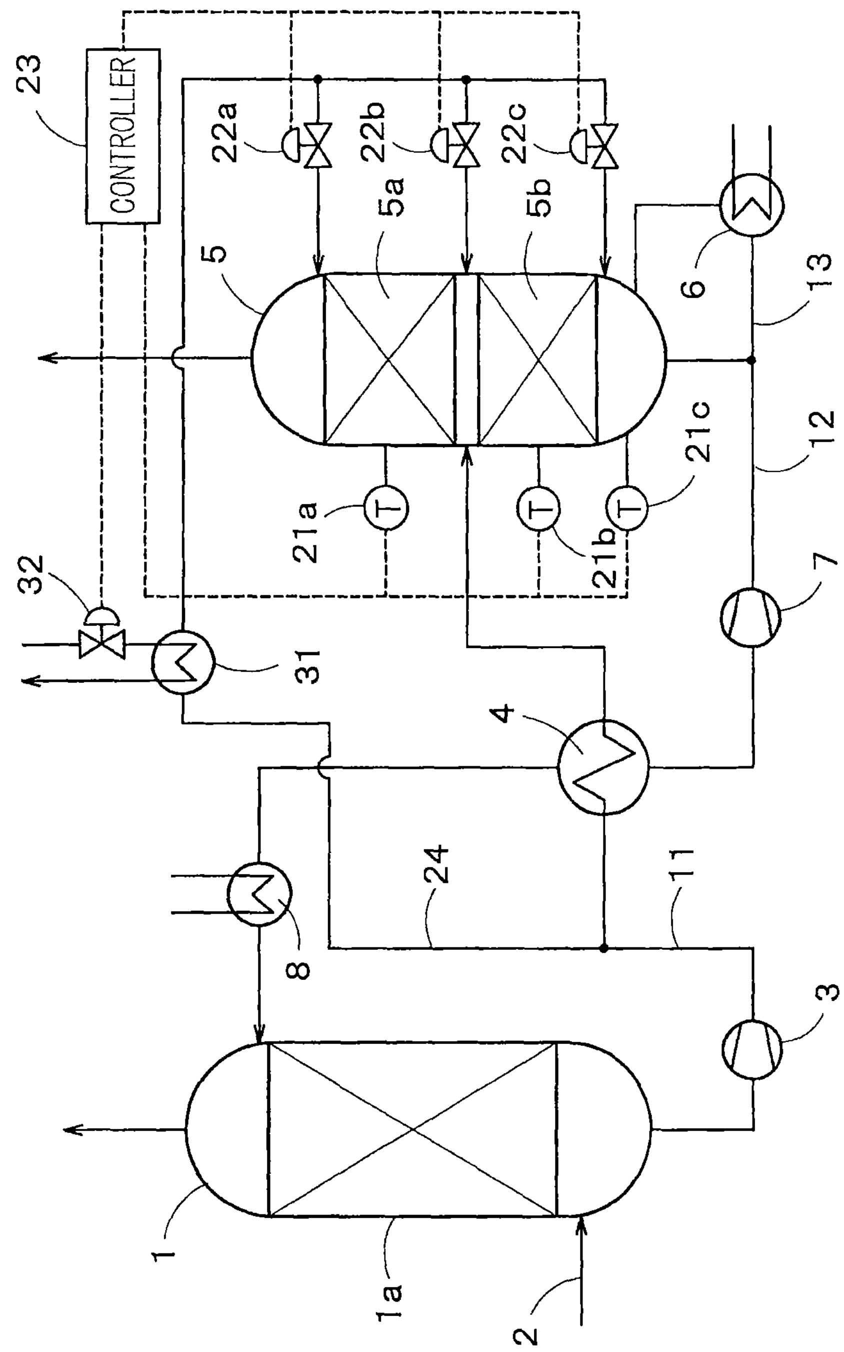
FIG. 4 is a schematic diagram illustrating a configuration of the carbon dioxide capturing system of the fourth embodiment.

FIG. 4 is a schematic diagram illustrating a configuration of the carbon dioxide capturing system of the fourth embodiment.

The system in FIG. 4 includes a cooler 31 and a refrigerant valve 32. The cooler 31 is provided on the bypass line 24 and cools the absorption liquid flowing in the bypass line 24 with a refrigerant. An example of the refrigerant is cooling water (the same applies hereafter). The refrigerant valve 32 is provided on a line for feeding the refrigerant to the cooler 31, and used for regulating a flow rate of the refrigerant fed to the cooler 31. The refrigerant valve 32 of the present embodiment is a flow regulating valve which can regulate the flow rate of the refrigerant by controlling its degree of opening.

The controller 23 of the present embodiment controls the refrigerant valve 32 as well as the absorption liquid valves 22*a* to 22*c*. Specifically, the controller 23 controls the degree of opening of the refrigerant valve 32, based on the temperatures measured by the thermometers 21*a* to 21*c*. For example, the controller 23 may control the degree of opening based on the average temperature of the thermometers 21*a* to 21*c*, and may control the degree of opening based on the highest temperature of the thermometers 21*a* to 21*c*. For example, the controller 23 of the present embodiment controls the degree of opening of the refrigerant valve 32 such that the degree of opening of the refrigerant valve 32 is an increasing function of the average temperature or the highest temperature of the thermometers 21*a* to 21*c*. Moreover, the controller 23 may control the degree of opening based on the temperature of one of the thermometers 21*a* to 21*c*, and may control the degree of opening based on the average temperature or the highest temperature of any two of the thermometers 21*a* to 21*c*.

When the controller 23 of the present embodiment receives a stop instruction of the facility in which the carbon dioxide capturing system is provided, the rich liquid is introduced from the bypass line 24 into the regenerator 5 in order to cool the regenerator 5. Here, since the absorption reaction of carbon dioxide in the absorber 1 is exothermic reaction, the rich liquid in the rich liquid line 11 and the bypass line 24 has a higher temperature than the lean liquid in the lean liquid line 12. Hence, in the present embodiment, the rich liquid flowing in the bypass line 24 is cooled by the cooler 31 in order to reduce the temperature in the regenerator 5 more quickly.

Figure 5:
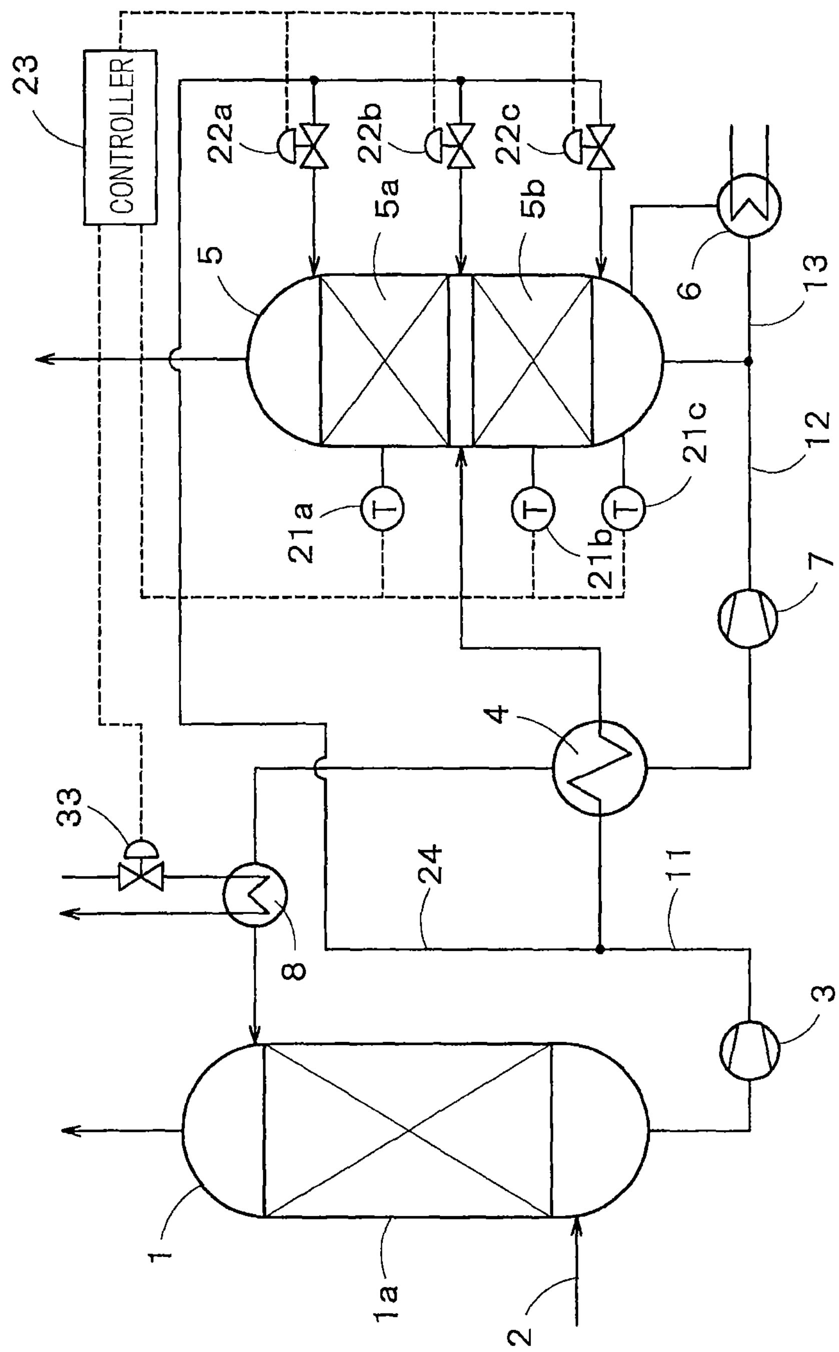
FIG. 5 is a schematic diagram illustrating a configuration of a carbon dioxide capturing system of a fifth embodiment.

FIG. 5 is a schematic diagram illustrating a configuration of a carbon dioxide capturing system of a fifth embodiment.

The system in FIG. 5 includes a refrigerant valve 33. The refrigerant valve 33 is provided on a line for feeding the refrigerant to the cooler 8 on the lean liquid line 12, and used for regulating a flow rate of the refrigerant fed to the cooler 8. The refrigerant valve 33 of the present embodiment is a flow regulating valve which can regulate the flow rate of the refrigerant by controlling its degree of opening.

The controller 23 of the present embodiment controls the refrigerant valve 33 as well as the absorption liquid valves 22*a* to 22*c*. Specifically, the controller 23 controls the degree of opening of the refrigerant valve 33, based on the temperatures measured by the thermometers 21*a* to 21*c*. For example, the controller 23 may control the degree of opening based on the average temperature of the thermometers 21*a* to 21*c*, and may control the degree of opening based on the highest temperature of the thermometers 21*a* to 21*c*. For example, the controller 23 of the present embodiment controls the degree of opening of the refrigerant valve 33 such that the degree of opening of the refrigerant valve 33 is an increasing function of the average temperature or the highest temperature of the thermometers 21*a* to 21*c*. Moreover, the controller 23 may control the degree of opening based on the temperature of one of the thermometers 21*a* to 21*c*, and may control the degree of opening based on the average temperature or the highest temperature of any two of the thermometers 21*a* to 21*c*.

When the rich liquid is introduced from the bypass line 24 into the regenerator 5, the flow rate of the rich liquid passing through the regenerative heat exchanger 4 decreases, and the exchanged heat amount in the regenerative heat exchanger 4 decreases. Hence, the lean liquid flowing in the lean liquid line 12 cannot undergo sufficient heat exchange with the rich liquid in the regenerative heat exchanger 4, and is discharged from the regenerative heat exchanger 4, maintaining its high temperature. As a result, cooling load on the cooler 8 on the lean liquid line 12 increases. Here, a drastic increase of the load on the cooler 8 makes the cooling difficult to respond the increase of the load. Hence, in the present embodiment, the absorption liquid valves 22*a* to 22*c* and the refrigerant valve 33 are controlled based on the temperatures of the thermometers 21*a* to 21*c*. Therefore, according to the present embodiment, the operation of the cooler 8 can be associated with the operation of the controller 23, which can improve response of the cooling of the cooler 8.

Figure 6:
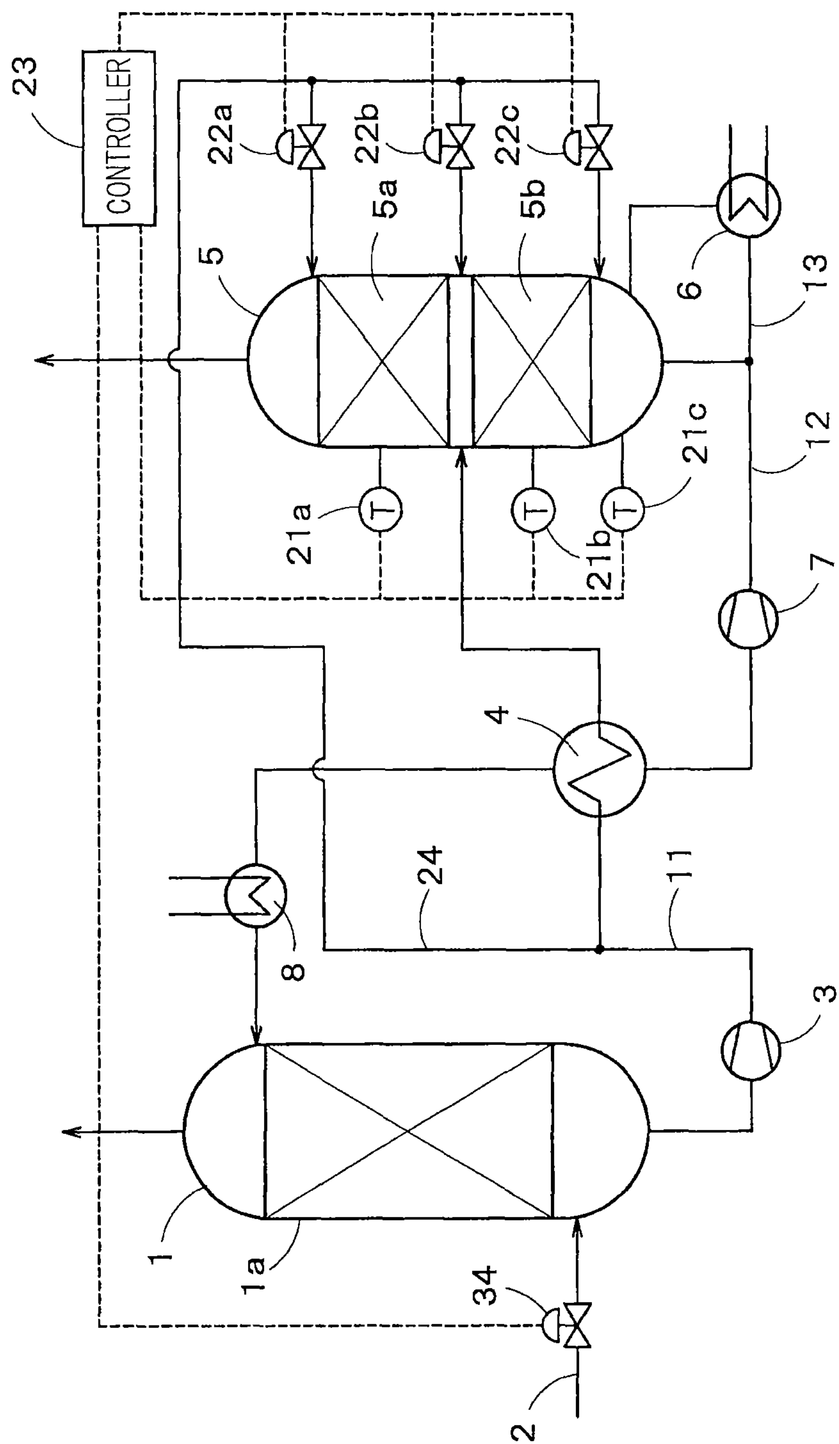
FIG. 6 is a schematic diagram illustrating a configuration of a carbon dioxide capturing system of a sixth embodiment.

FIG. 6 is a schematic diagram illustrating a configuration of a carbon dioxide capturing system of a sixth embodiment.

The system in FIG. 6 includes an exhaust gas valve 34. The exhaust gas valve 34 is provided on the process exhaust gas line 2, and used for regulating a flow rate of the process exhaust gas flowing in the process exhaust gas line 2. The exhaust gas valve 34 of the present embodiment is a flow regulating valve which can regulate the flow rate of the process exhaust gas by controlling its degree of opening.

The controller 23 of the present embodiment controls the exhaust gas valve 34 as well as the absorption liquid valves 22*a* to 22*c*. Specifically, the controller 23 controls the degree of opening of the exhaust gas valve 34, based on the temperatures measured by the thermometers 21*a* to 21*c*. For example, the controller 23 may control the degree of opening based on the temperature of one of the thermometers 21*a* to 21*c*, and may control the degree of opening based on the average temperature or the highest temperature of two or more of the thermometers 21*a* to 21*c*.

When the controller 23 of the present embodiment receives a stop instruction or a low-load operation instruction of the facility in which the carbon dioxide capturing system is provided, the control regarding the degrees of opening of the absorption liquid valves 22*a* to 22*c* is performed in association with the control regarding the degree of opening of the exhaust gas valve 34. Specifically, the controller 23 starts to introduce the absorption liquid from the bypass line 24 to the regenerator 5, and reduces the flow rate of the process exhaust gas or stops introducing the same.

When introducing the process exhaust gas is stopped, the absorption reaction of carbon dioxide which is exothermic reaction does not take place in the absorber 1, which reduces the temperature of the absorption liquid flowing in the bypass line 24. Therefore, the temperature in the regenerator 5 can be more efficiently reduced.

Meanwhile, when the carbon dioxide capturing system is brought into the state where the standby operation is possible, the controller 23 of the present embodiment reduces the flow rate of the process exhaust gas. For example, in the case where carbon dioxide is wanted to be sufficiently absorbed in the absorption liquid in the facility, the controller 23 reduces the temperature in the regenerator 5 to stop releasing carbon dioxide from the regenerator 5, and causes the absorption reaction to proceed in the absorber 1. In this case, there is a possibility that the absorption liquid introduced from the lean liquid line 12 into the absorber 1 becomes to have a high temperature. Hence, when a large amount of process exhaust gas is introduced into the absorber 1, there is a concern that the temperature in the absorber 1 becomes high. Therefore, when the carbon dioxide capturing system is brought into the state where the standby operation is possible, the controller 23 of the present embodiment reduces the flow rate of the process exhaust gas. Thereby, while the temperature in the regenerator 5 is low, the absorption reaction can be allowed to properly proceed in the absorber 1.

Figure 7:
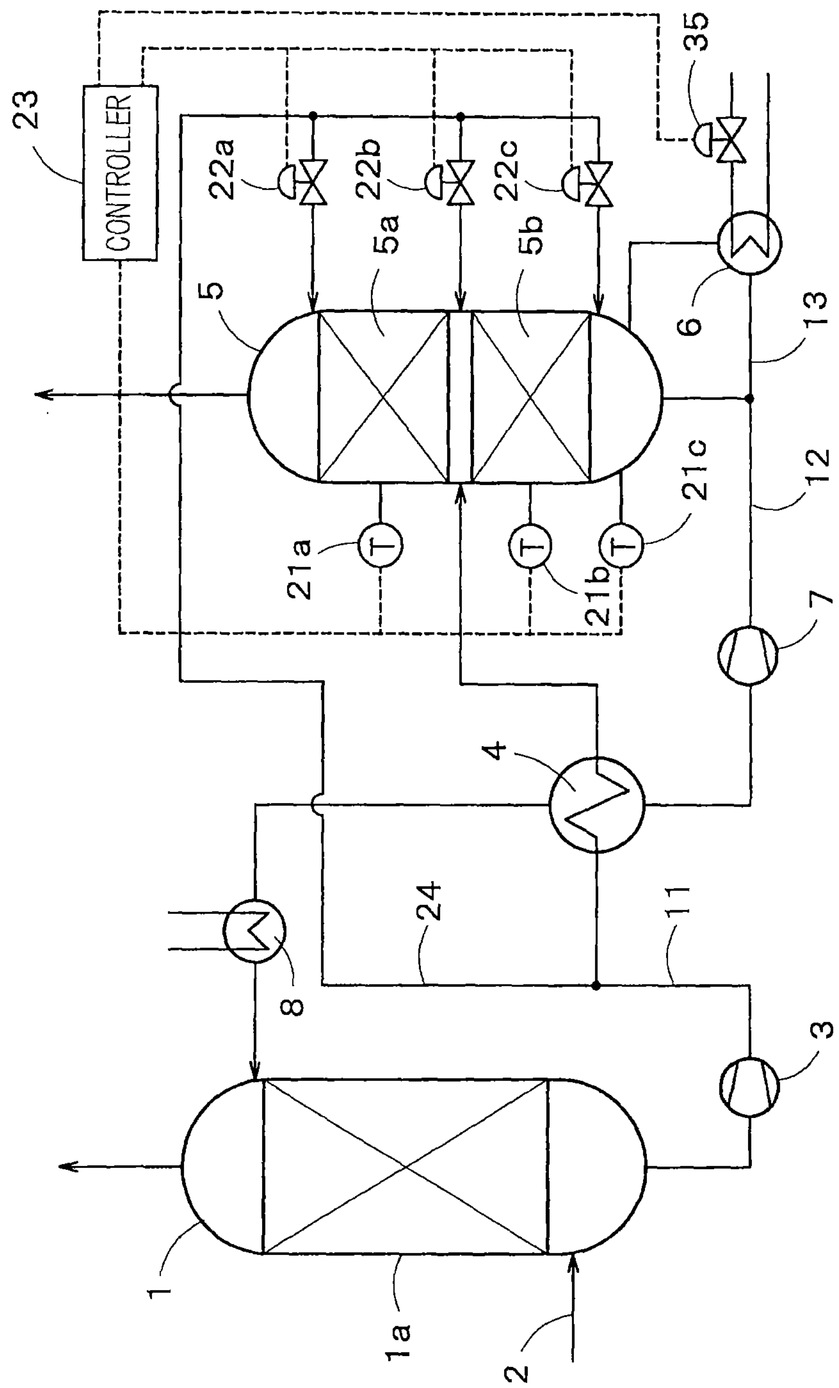
FIG. 7 is a schematic diagram illustrating a configuration of a carbon dioxide capturing system of a seventh embodiment.

FIG. 7 is a schematic diagram illustrating a configuration of a carbon dioxide capturing system of a seventh embodiment.

The system in FIG. 7 includes a vapor valve 35. The vapor valve 35 is provided on a line for feeding vapor which is a heat source to the reboiler 6, and used for regulating a flow rate of the vapor fed to the reboiler 6. The vapor valve 35 of the present embodiment is a flow regulating valve which can regulate the flow rate of the vapor by controlling its degree of opening.

The controller 23 of the present embodiment controls the vapor valve 35 as well as the absorption liquid valves 22*a* to 22*c*. Specifically, the controller 23 controls the degree of opening of the vapor valve 35, based on the temperatures measured by the thermometers 21*a* to 21*c*. For example, the controller 23 may control the degree of opening based on the temperature of one of the thermometers 21*a* to 21*c*, and may control the degree of opening based on the average temperature or the highest temperature of two or more of the thermometers 21*a* to 21*c*. The controller 23 of the present embodiment controls the degree of opening of the vapor valve 35, and thereby, can control the input heat amount to the reboiler 6.

When the controller 23 of the present embodiment receives a stop instruction or a low-load operation instruction of the facility in which the carbon dioxide capturing system is provided, the control regarding the degrees of opening of the absorption liquid valves 22*a* to 22*c* is performed in association with the control regarding the degree of opening of the vapor valve 35. Specifically, the controller 23 starts to introduce the absorption liquid from the bypass line 24 into the regenerator 5, and reduces the flow rate of the vapor fed to the reboiler 6 or stops feeding the same.

For example, in the case where, after the regenerator 5 is cooled for low-load operation, the temperature in the regenerator 5 is maintained to be a configured temperature, the controller 23 of the present embodiment associates the controls of the absorption liquid flow rate in the bypass line 24 and the vapor flow rate for the reboiler 6 with each other, and thereby, can efficiently perform the cooling of the regenerator 5 and the temperature maintenance of the regenerator 5. In this case, for example, the controller 23 reduces the vapor flow rate for the reboiler 6 in association with the operation of reducing the temperature in the regenerator 5 with the absorption liquid from the bypass line 24 to be a temperature close to the configured temperature, so that the regenerator 5 is quickly cooled. After that, the controller 23 regulates the absorption liquid flow rate and the vapor flow rate based on the temperatures of the thermometers 21*a* to 21*c*, and thereby, can maintain the temperature in the regenerator 5 to be the configured temperature.

In place of heating the absorption liquid with the heat of the vapor, the reboiler 6 of the present embodiment may heat the absorption liquid with the heat from an electric heater. In this case, the controller 23 controls power supplied to the electric heater, and thereby, can control the input heat amount to the reboiler 6. The reboiler 6 of the present embodiment may be replaced by another heater which can control the temperature in the regenerator 5. In this case, the controller 23 controls the input heat amount to the heater, based on the temperatures measured by the thermometers 21*a* to 21*c*.

Figure 8:
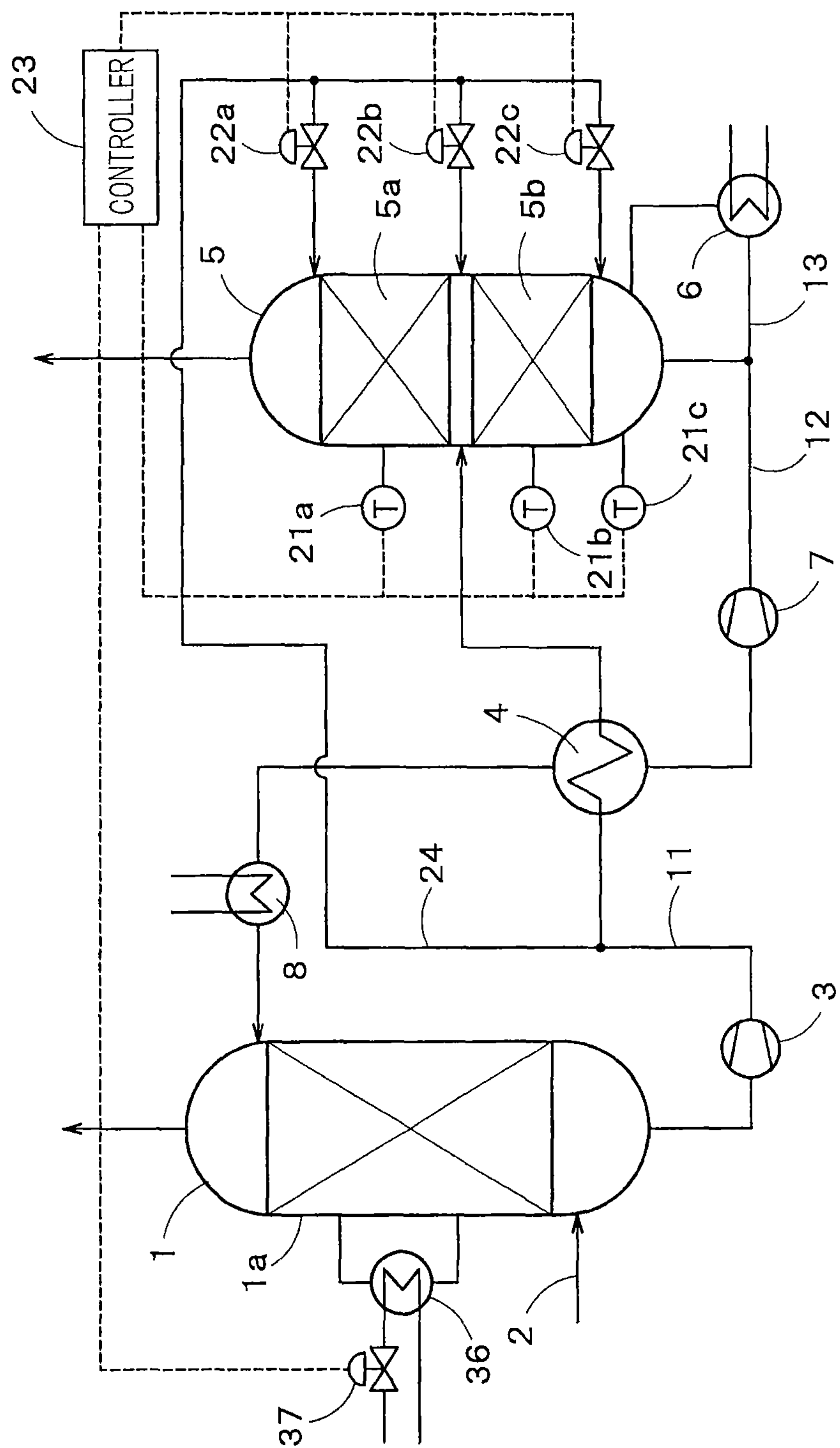
FIG. 8 is a schematic diagram illustrating a configuration of a carbon dioxide capturing system of an eighth embodiment.

FIG. 8 is a schematic diagram illustrating a configuration of a carbon dioxide capturing system of an eighth embodiment.

The system in FIG. 8 includes a cooler 36 and a refrigerant valve 37. The cooler 36 and the refrigerant valve 37 are an example of a cooling module. The cooler 36 extracts the absorption liquid from the absorber 1, cools the extracted absorption liquid with a refrigerant, and returns the cooled absorption liquid to the absorber 1. The refrigerant valve 37 is provided on a line for feeding the refrigerant to the cooler 36, and used for regulating a flow rate of the refrigerant fed to the cooler 36. The refrigerant valve 37 of the present embodiment is a flow regulating valve which can regulate the flow rate of the refrigerant by controlling its degree of opening.

The controller 23 of the present embodiment controls the refrigerant valve 37 as well as the absorption liquid valves 22*a* to 22*c*. Specifically, the controller 23 controls the degree of opening of the refrigerant valve 37, based on the temperatures measured by the thermometers 21*a* to 21*c*. For example, the controller 23 may control the degree of opening based on the temperature of one of the thermometers 21*a* to 21*c*, and may control the degree of opening based on the average temperature or the highest temperature of two or more of the thermometers 21*a* to 21*c*. The controller 23 of the present embodiment controls the degree of opening of the refrigerant valve 37, and thereby, can control the operation of the cooling module including the cooler 36 and the refrigerant valve 37.

The controller 23 of the present embodiment increases the flow rate of the refrigerant, and thereby, can reduce the temperature of the absorption liquid in the absorber 1. Thereby, the controller 23 can reduce the temperature of the absorption liquid introduced from the bypass line 24 into the regenerator 5, and can cool the regenerator 5 more efficiently.

While the cooler 36 of the present embodiment is a heat exchanger which cools the absorption liquid by heat exchange between the absorption liquid and the refrigerant, it may be an apparatus that cools the absorption liquid in another manner.

Moreover, while the carbon dioxide capturing system of the present embodiment includes one cooler 36 for one absorber 1, it may include plural coolers 36 for one absorber 1. In this case, the controller 23 of the present embodiment may control all of the plural coolers 36, or may control only part of the plural coolers 36.

According to the present embodiment, similarly to the first to third embodiments, a high-temperature portion in the carbon dioxide capturing system can be quickly cooled, and the carbon dioxide capturing system can be quickly brought into a safe state.

While certain embodiments have been described, these embodiments have been presented by way of example only, and are not intended to limit the scope of the inventions. Indeed, the novel systems and methods described herein may be embodied in a variety of other forms; furthermore, various omissions, substitutions and changes in the form of the systems and methods described herein may be made without departing from the spirit of the inventions. The accompanying claims and their equivalents are intended to cover such forms or modifications as would fall within the scope and spirit of the inventions.

The invention claimed is:

1. A carbon dioxide capturing system comprising:

an absorber configured to bring a gas containing carbon dioxide into contact with an absorption liquid capable of absorbing the carbon dioxide, and to discharge the absorption liquid having absorbed the carbon dioxide;

a regenerator configured to cause the absorption liquid discharged from the absorber to release the carbon dioxide, and to discharge the absorption liquid having released the carbon dioxide;

a first absorption liquid line configured to introduce the absorption liquid discharged from the absorber to the regenerator;

a second absorption liquid line configured to introduce the absorption liquid discharged from the regenerator to the absorber;

a heat exchanger configured to exchange heat between the absorption liquid flowing in the first absorption liquid line and the absorption liquid flowing in the second absorption liquid line;

a bypass line configured to branch from the first absorption liquid line between the absorber and the heat exchanger, and to introduce the absorption liquid to the regenerator without passing through the heat exchanger;

at least one absorption liquid valve provided on the bypass line;

at least one measuring instrument configured to measure a value that indicates a state of the regenerator; and a controller configured to control a degree of opening of the absorption liquid valve, based on the value measured by the measuring instrument, wherein the measuring instrument is configured to measure at least one of a flow rate of a gas discharged from the regenerator and a pressure in the regenerator.

2. The system of claim 1, wherein the measuring instrument is further configured to measure a temperature in the regenerator.

3. The system of claim 1, wherein the controller controls the degree of opening of the absorption liquid valve such that a flow rate of the absorption liquid introduced from the bypass line to the regenerator is 80% or less of a flow rate of the absorption liquid discharged from the absorber to the first absorption liquid line.

4. The system of claim 1, wherein the at least one absorption liquid valve includes first to Nth absorption liquid valves where N is an integer of two or more, the at least one measuring instrument includes first to Nth measuring instruments, and the controller controls a degree of opening of a Kth absorption liquid valve, based on a value measured by a Kth measuring instrument where K is an integer satisfying $1 \leq K \leq N$.

5. The system of claim 1, further comprising:

a cooler configured to cool the absorption liquid flowing in the bypass line; and a refrigerant valve configured to regulate a flow rate of a refrigerant in the cooler, wherein the controller controls a degree of opening of the refrigerant valve, based on the value measured by the measuring instrument.

6. The system of claim 1, further comprising:

a cooler configured to cool the absorption liquid flowing in the second absorption liquid line; and a refrigerant valve configured to regulate a flow rate of a refrigerant in the cooler, wherein the controller controls a degree of opening of the refrigerant valve, based on the value measured by the measuring instrument.

7. The system of claim 1, further comprising:

a gas line configured to introduce the gas containing the carbon dioxide to the absorber; and a gas valve configured to regulate a flow rate of the gas flowing in the gas line, wherein the controller controls a degree of opening of the gas valve, based on the value measured by the measuring instrument.

8. The system of claim 1, further comprising a heater configured to heat the regenerator, wherein the controller controls an input heat amount to the heater, based on the value measured by the measuring instrument.

9. The system of claim 1, further comprising a cooling module configured to extract the absorption liquid from the absorber, cool the extracted absorption liquid, and return the cooled absorption liquid to the absorber, wherein the controller controls operation of the cooling module, based on the value measured by the measuring instrument.

10. A method of operating a carbon dioxide capturing system, the system comprising:

an absorber configured to bring a gas containing carbon dioxide into contact with an absorption liquid capable of absorbing the carbon dioxide, and to discharge the absorption liquid having absorbed the carbon dioxide;

a regenerator configured to cause the absorption liquid discharged from the absorber to release the carbon dioxide, and to discharge the absorption liquid having released the carbon dioxide;

a first absorption liquid line configured to introduce the absorption liquid discharged from the absorber to the regenerator;

a second absorption liquid line configured to introduce the absorption liquid discharged from the regenerator to the absorber; and a heat exchanger configured to exchange heat between the absorption liquid flowing in the first absorption liquid line and the absorption liquid flowing in the second absorption liquid line, the method comprising:

measuring a value that indicates a state of the regenerator with at least one measuring instrument;

controlling, based on at least one of a flow rate of a gas discharged from the regenerator and a pressure in the regenerator, a degree of opening of at least one absorption liquid valve provided on a bypass line that branches from the first absorption liquid line between the absorber and the heat exchanger and introduces the absorption liquid to the regenerator without passing through the heat exchanger; and introducing the absorption liquid discharged from the absorber to the regenerator through the first absorption liquid line and the bypass line.

* * * * *

UNITED STATES PATENT AND TRADEMARK OFFICE

CERTIFICATE OF CORRECTION

PATENT NO. : 9,815,016 B2
APPLICATION NO. : 14/744285
DATED : November 14, 2017
INVENTOR(S) : Mitsuru Udatsu et al.

It is certified that error appears in the above-identified patent and that said Letters Patent is hereby corrected as shown below:

On the Title Page

Item (73), the Assignees' information is incorrect. Item (73) should read:
--(73) Assignees: KABUSHIKI KAISHA TOSHIBA, Minato-ku (JP)
TOSHIBA PLANT SYSTEMS & SERVICES CORPORATION, Yokohama-shi (JP)--

Signed and Sealed this
Fourteenth Day of August, 2018

Andrei Iancu
*Director of the United States Patent and Trademark Office*